United States Patent [19]

Flagg et al.

[11] Patent Number: 5,050,726
[45] Date of Patent: Sep. 24, 1991

[54] VERTICAL LIFT CONVEYOR

[76] Inventors: Rodger H. Flagg, 2101 Crystal Plaza Arc., Suite 135, Arlington, Va. 22202; Cristopher H. Flagg, 8514 Sinon St., Annandale, Va. 22003

[21] Appl. No.: 597,330

[22] Filed: Oct. 15, 1990

[51] Int. Cl.⁵ .............................................. B65G 47/04
[52] U.S. Cl. .................................. 198/475.1; 198/794; 198/800
[58] Field of Search ....................... 198/475.1, 799, 800

[56] References Cited

U.S. PATENT DOCUMENTS

| | | | |
|---|---|---|---|
| 4,214,848 | 7/1980 | Verwey et al. | 198/475.1 |
| 4,465,177 | 8/1984 | Dorner | 198/475.1 |
| 4,732,266 | 3/1988 | Dorner | 198/799 |
| 4,986,411 | 1/1991 | Splitstoser et al. | 198/475.1 |
| 4,987,992 | 1/1991 | Pfleger | 198/475.1 |

FOREIGN PATENT DOCUMENTS 2079235 1/1982 United Kingdom ................ 198/800

*Primary Examiner*—Joseph E. Valenza
*Attorney, Agent, or Firm*—Rodger H. Flagg

[57] ABSTRACT

An improved vertical lift conveyor for moving articles between different heights, in a generally rectangular path of travel, utilizing at least one cantilevered platform. A first drive is rotatably secured to a support structure, and a second drive of equal length, is rotatably secured to the opposite side of the support structure, in parallel, vertically offset alignment. The first and second drive are secured to side supports by a plurality of rotating devices which define a generally rectangular path of travel. Channel are aligned with the first and second drive and secured to the support structure. First and second mounting brackets are secured on opposite sides of the cantilevered platform, in vertically offset alignment. The first and second mounting brackets are preferably adjustably secured for ease of alignment at asssembly. First and second horizontal pins are secured to the respective first and second drive in alignment with the first and second mounting brackets. First and second rollers are secured in axial alignment with the respective first and second horizontal pins adjacent to the first and second drive. The first and second rollers are guided in the channel along a vertically offset, rectangular path of travel; and a power means is secured to the support structure, and coupled to the vertically offset first and second drive to move the cantilevered platform horizontally, along the vertically offset, rectangular path of travel.

20 Claims, 6 Drawing Sheets

VERTICAL LIFT CONVEYOR

BACKGROUND OF THE INVENTION

Material handling systems often employ conveyers to move articles from one location to another. Gravity conveyers are inclined downward to move articles on rollers with the force of gravity. Gravity conveyers are reliable and inexpensive, but they do have a significant limitation. They only work when material is being moved from an upper location to a lower location.

In large installations, this limitation inhibits the extended use of gravity conveyors, and to solve these problems, inclined powered conveyers are at times used. While inclined powered conveyers will move articles in an upward direction along a controlled incline, they require a lot of space to raise an article to a desired height.

Vertical lift conveyers move articles from an inlet conveyer to an outlet conveyer at a different height in a limited space. Vertical lift conveyers typically employ a horizontal platform which is driven in a continuous rectangular path of travel by actuation of chain, belts or cable.

The horizontal platform includes spaced arms which are aligned to pass between spaced inlet conveying means adjacent to the inlet conveyer in an upward vertical path to lift an article from the inlet conveying means. The horizontal platform follows the rectangular path of travel and deposits the article on the downward vertical path onto the outlet conveying means adjacent to the output conveyer. One or more horizontal platforms may be secured to the drive means in spaced relation, to provide multiple lift capacity during the continuous rectangular path of travel of the drive means.

Where cantilevered platforms have been used to lift articles between levels in a rectangular path of travel, additional guide means, track, brackets, etc. have been required to maintain the platform in a horizontal position during its rectangular path of travel. These additional guide means are normally offset from the point of connection of the horizontal platform to the drive means, and require two or more rollers on each side of the platform, to keep the platform horizontal during its rectangular path of travel. U.S. Pat. No. 4,214,848 is representative of prior art having an offset track and guide means to support a cantilevered platform.

Where the platform is rigidly secured to the drive means, as disclosed in U.S. Pat. No. 4,273,234, the platform does not remain horizontal during its rectangular path of travel. The platform must be pivotally mounted to the drive means, to maintain a horizontal position during the upward, backward, downward, and forward paths of travel.

Where the horizontal platform is supported by a drive means on the forward and rearward sides of the horizontal platform, as noted in U.S. Pat. No. 4,465,177, the drive means extends along both the forward path of travel on one side of each horizontal platform, and along the rearward path of travel on the opposite side of each platform. This limits access on one side of the horizontal platform at the inlet and outlet conveyers. U.S. Pat. No. 4,465,177 does not disclose a cantilevered horizontal platform, nor does U.S. Pat. No. 4,465,177 solve the problems associated with the resultant forces imposed upon the drive means by a cantilevered horizontal platform.

SUMMARY OF THE INVENTION

The present invention is directed to an improved vertical conveyer which conveys articles between an input conveyer and an output conveyer, in a rectangular path of travel, utilizing at least one cantilevered platform which is rotatably secured on one side to a first drive means having a rectangular path of travel, and is rotatably secured on the opposite side of the cantilevered platform to a second drive means having a rectangular path of travel of equal size and length, which is vertically offset a pre-determined distance from the first drive means.

Each cantilevered platform is secured to the first and second drive means by respective first and second horizontal pins rotatably engaged in first and second mounting brackets which are secured on opposite sides of the cantilevered platform, in a pre-determined vertically offset alignment. The pre-determined vertically offset alignment of the first and second mounting brackets is equal to the pre-determined vertically offset alignment of the first and second drive means.

A single roller is disposed adjacent to each of the drive means in axial alignment with the horizontal pins. The roller is guided in a channel substantially along the entire rectangular path of travel. The channel is sized to receive the roller between opposing sides and to preferably at least partially enclose the chain within the channel.

The single roller on each side of the cantilevered platform serves to transfer the cantilevered load of the platform to the channel which is secured to the opposing sides of the vertical conveyer structure. The vertically offset alignment of the opposing rollers serve to maintain horizontal alignment of the cantilevered platform during its entire rectangular path of travel.

DESCRIPTION OF THE DRAWINGS

The above mentioned and other features and objects of this invention and the manner of attaining them will become more apparent and the invention itself will be best understood by reference to the following description of the invention taken in conjunction with the accompanying drawings, wherein.

DESCRIPTION OF THE PREFERRED EMBODIMENT

Figure 1:
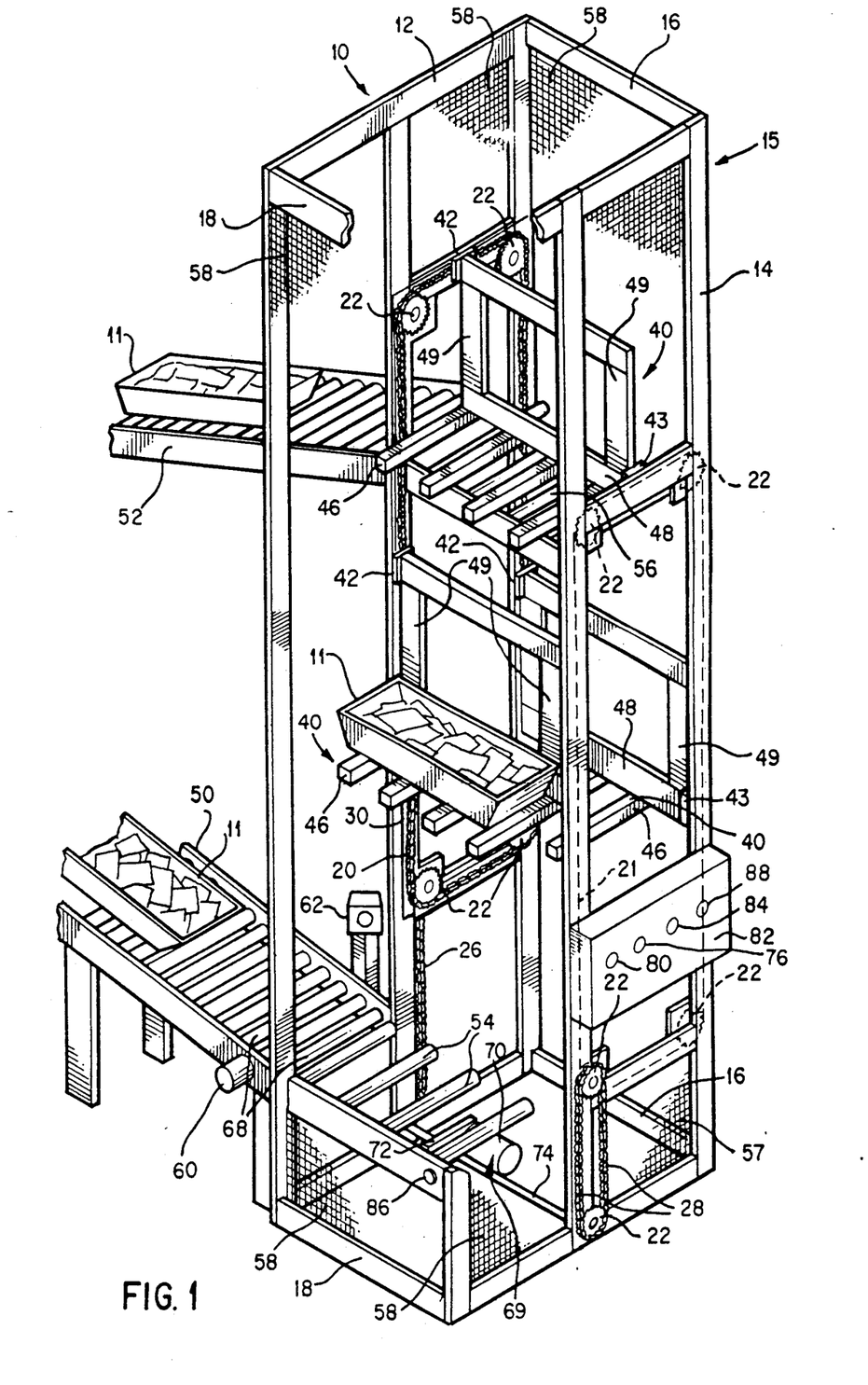
FIG. 1 is an isometric view of the vertical conveyer, showing a side mounted inlet conveyer, and a side mounted outlet conveyer.

As shown in perspective in FIG. 1, the vertical conveyer assembly 10 comprises a support structure 15, having a first side structure 12 and a second side structure 14 disposed in parallel, spaced relation. The side structures 12, 14 are held in spaced parallel alignment by suitable cross braces 16, 18. The first and second side structures 12, 14 and cross braces 16, 18 may be fabricated by welding, bolting or otherwise securing suitable structural material, such as metal tubing, in a manner to safely support the vertical conveyer 10 during use.

A first and second drive means 20, 21 may be any suitable chain, cable, belt or other device known in the art, which may be controllably moved in a generally rectangular path of travel. The first and second drive means 20, 21 are identical in size and length and are vertically offset, a pre-determined distance to provide the desired results herein disclosed.

Sprockets, pulleys or other known rotating means 22, provide a radius for transition for the first and second drive means 20, 21 over the rectangular path of travel. The rotating means 22 are preferably of uniform size.

To raise an article 11 from the lower inlet conveyer 50 to an upper outlet conveyer 52, the first and second drive means 20, 21 travel in a generally upward vertical, rearward horizontal, downward vertical, and forward horizontal direction over the rectangular path of travel. To move an article 11 from an upper conveyer 52 to a lower conveyer 50, the direction of travel of drive means 20, 21 over the rectangular path of travel would be reversed.

A boss 24, may be in the form of a pillow block or bearing mount, or other suitable means to rotatably secure the rotating means 22 to the side structures 12, 14. Each boss 24 may be rigidly secured to side structure 12, 14, and may include a suitable bearing means (not shown).

Preferably, one boss 24 on each side 12, 14 is adjustably positioned and secured to each side structure 12, 14 to provide a tension adjustment for drive means 20, 21. Alternately, any known tensioning device (not shown), may be used to adjust tension on each drive means 20, 21.

Figure 3A:
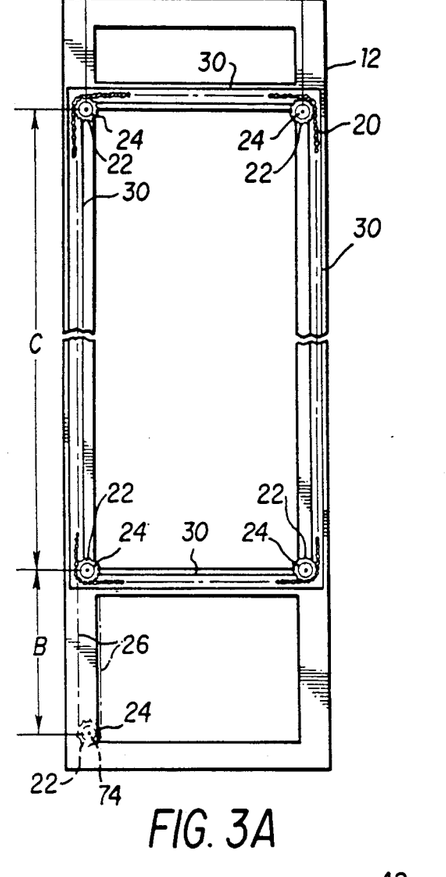
FIG. 3A is a detail view of one side of the vertical conveyer structure having a raised rectangular path of travel.

Referring now to FIG. 3A, a first channel 30 is secured to one side 12 of a suitable support structure 15, substantially about the rectangular path of travel of the first drive means 20. The vertically offset raised drive means 20 is offset from a common drive shaft 74 by distance "B". The rectangular path of travel of first drive means 20, is represented by distances "C" and "D".

Figure 3B:
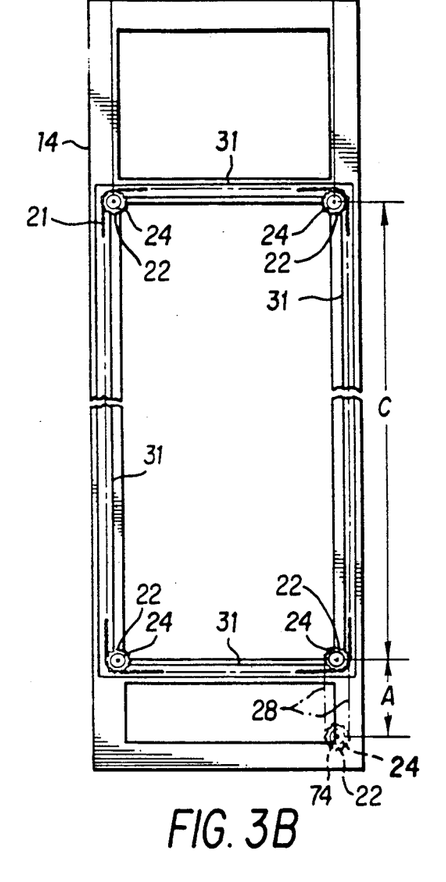
FIG. 3B is a detail view of the opposite side of the vertical conveyer structure with a lower, rectangular path of travel.

FIG. 3B shows a second channel 31 secured to second side 14, substantially about the rectangular path of travel of the second drive means 21. The vertically offset second drive means 21 is offset from common drive shaft 74 by distance "A". The rectangular path of travel of the second drive means 21, is represented by distances "C" and "D". Note that the rectangular path of travel of first and second drive means 20, 21 are identical in dimensions "C" and "D", but vertically offset a pre-determined distance represented by "B" minus "A", shown in FIG. 3A and 3B.

The pre-determined distance must be sufficient to resist rotation of cantilevered platform 40 about opposing, vertically offset first and second horizontal pins 44, 45. This pre-determined vertically offset distance may be as small as a few inches, or may be as high as the articles 11 placed upon the cantilevered platform, or higher to suit design preference, load capacity, etc. Preferably the pre-determined vertically offset distance is selected from a range of from six inches to 48 inches.

First channel 30 is secured to first side 12, and second channel 31 is secured to second side 14 by any conventional means, such as welding, bolting, riveting, adhesive bonding, etc. A suitable fixture may be used to align the channel 30, 31 and rotating means 22 prior to securement to respective sides 12, 14.

First drive means 20 is preferably at least partially enclosed at assembly within first channel 30 substantially along the entire rectangular path of travel. Second drive means 21 is preferably at least partially enclosed at assembly within second channel 31 substantially along the entire rectangular path of travel.

An optional chain guard bracket (not shown) may be secured on at least one side of the channel to substantially enclose the chain, while allowing first or second pins 44, 45 to extend from the drive means to rotatably engage first or second mounting brackets 42, 43. Suitable guard brackets 37 may also enclose each rotating means 22, for safety.

At least one cantilevered platform 40 is secured to the first drive means 20 by a first horizontal pin 44, rotatably engaged within a first mounting bracket 42, rearwardly secured to one side of the cantilevered platform 40. The opposite side of the cantilevered platform 40 is secured to the second drive means 21 by a second horizontal pin 45, rotatably engaged within a second mounting bracket 43 rearwardly secured to the opposite side of the cantilevered platform 40.

Horizontal pins 44, 45 are secured to respective drive means 20, 21 in vertically offset alignment of a pre-determined distance equal to the vertically offset alignment of the first and second drive means, referenced above as "B" minus "A". The first and second mounting brackets 42, 43 secured to cantilevered platform 40 are also vertically offset a pre-determined distance equal to the vertical offset alignment of the first and second drive means, referenced above as "B" minus "A".

Figure 5:
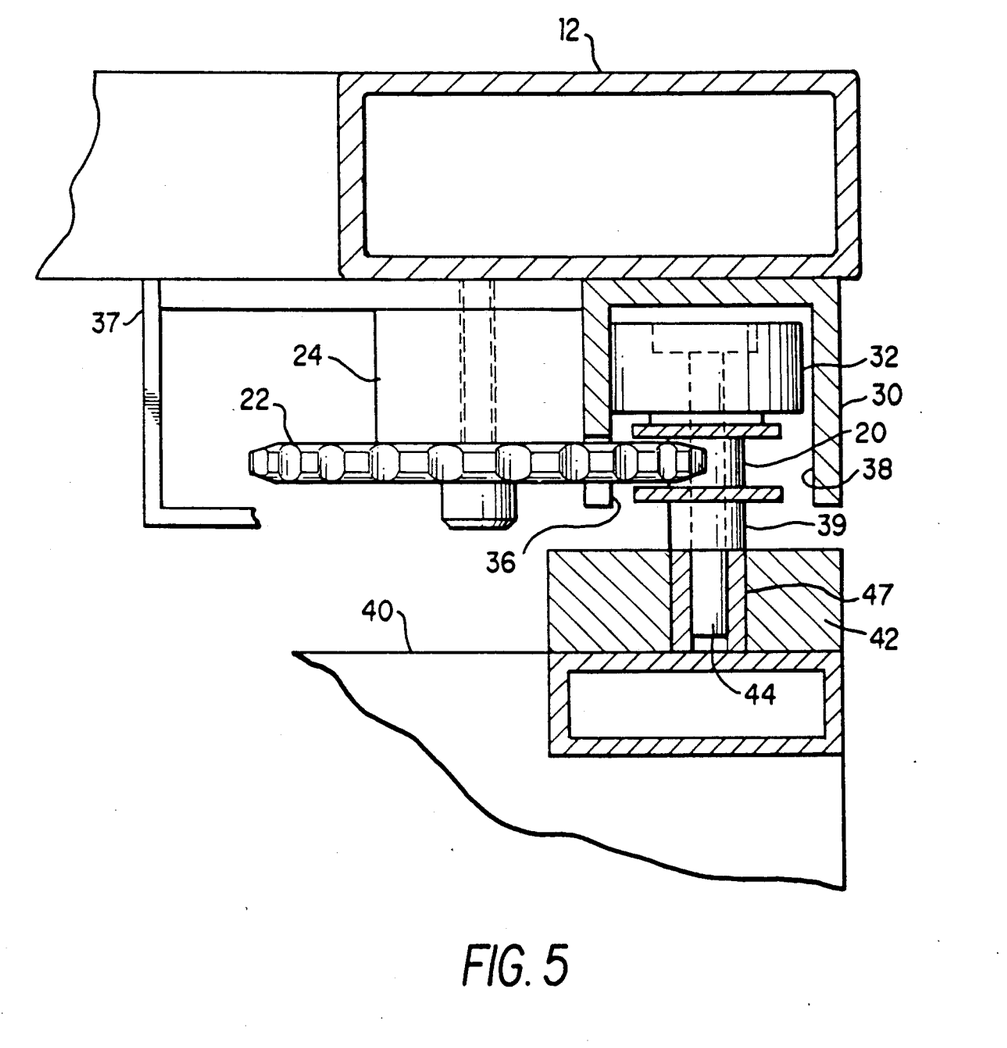
FIG. 5 is a cross sectional view showing the horizontal pin secured to the drive means, with a roller disposed in axial alignment with the horizontal pin, adjacent to the drive means.

As shown in FIG. 5, a first roller 32 is rotatably secured in axial alignment with the first horizontal pin 44 adjacent to the first drive means 20. A second roller 34 is rotatably secured in axial alignment to the second horizontal pin 45 adjacent to the second drive means 21. The first and second rollers 32, 34 are positioned to be received within respective first and second channels 30, 31. First and second rollers 32, 24 are preferably at least partially made of a long wearing material, such as ultra high weight molecular polyethylene.

Rotating means 22 is rotatably secured to boss 24, which is secured to side 12 or 14 of support structure 15. Channel 30, 31 is partially cut away in proximity to rotating means 22, to allow rotating means 22 to engage respective drive means 20, 21. A suitable guard bracket 37 may be used to removably enclose rotating means 22 for safety.

A suitable spacer 39 may be placed over horizontal pin 44, 45 between first or second drive means 20, 21 and respective mounting bracket 42, 43, to aid in positioning cantilevered platform 40.

While it is within the scope of the disclosure and claims to mount first roller 32 adjacent to first drive means 20, at a location between the first mounting bracket 42 and drive means 20 (not shown); first roller 32 is preferably mounted adjacent to first drive means 20, with first drive means 20 disposed between first roller 32 and first mounting bracket 42, as shown in FIG. 5.

Likewise, second roller 34 is preferably mounted adjacent to second drive means 21, with second drive means 21 disposed between second roller 34 and second mounting bracket 43. In either case, rollers 32, 34 are mounted adjacent to respective drive means 20, 21 in axial alignment with respective first and second horizontal pins 44, 45.

First and second rollers 32, 34 transfer the cantilevered load from the cantilevered platform 40, to respective first and second channels 30, 31, which are secured to first and second sides 12, 14 of support structures 15. Without the support of the first and second rollers 32, 34 in respective channels 30, 31 the first and second drive means 20, 21 would substantially deflect as the cantilevered platform 40 is moved between rotating means 22.

This deflection of drive means 20, 21 would unacceptably tilt the cantilevered platform 40 during the course of rectangular travel about the vertical conveyer 10. First and second channels 30, 31 are preferably sized to enclose the respective first and second rollers 32, 34 between respective sides 36, 38 and to at least partially enclose the opposing, first and second drive means, 20, 21 between opposing sides 36, 38.

The first roller 32 is biased by the weight of the cantilevered platform 40 to engage the inner front side 36 of the first channel 30, whereas the second roller 34 is biased by the weight of the cantilevered platform 40 to engage the inner rear side 38 of the second channel 31, during the upward and downward paths of travel.

Since the rollers 32, 34 are of an overall diameter smaller than the space between the sides 36, 38 of first and second channels 30, 31, there is no chance for the rollers 32, 34 to bind during their travel over their respective rectangular paths of travel.

Figure 6:
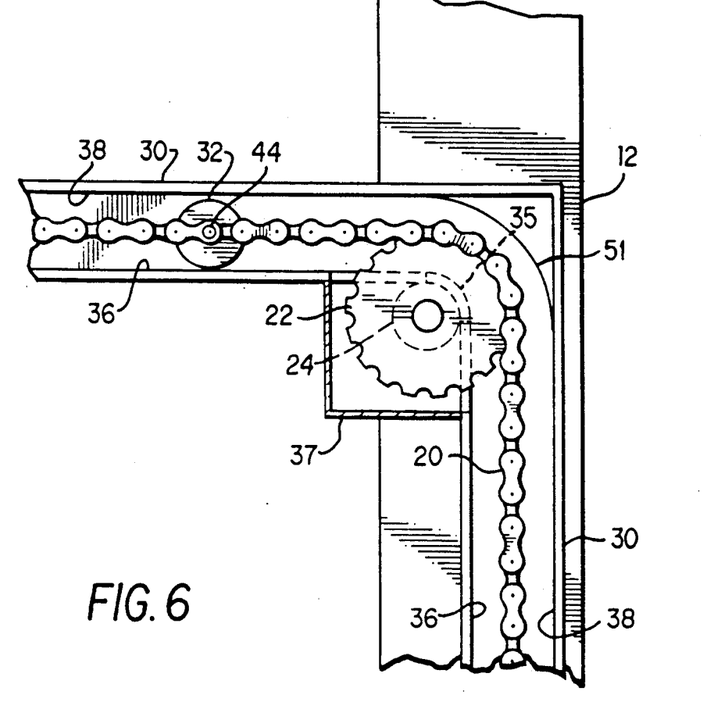
FIG. 6 is a partial view of the support structure showing the rotating means engaged with the drive means at an upper corner of the rectangular path of travel.

Referring now to FIG. 6, boss 24 is secured to first or second side 12, 14 of support structure 15. Rotating means 22 is rotatably secured to boss 24. First or second drive means 20, 21 engages the outer circumference of rotating means 22. First or second channel 30, 31 are aligned with respective first or second drive means 20, 21, and secured to respective sides 12, 14 of support structure 15, by any conventional means such as welding, bolting, etc. Channel 30, 31 is relieved in proximity to rotating means 22, and an insert 35 may be used adjacent to boss 24 to provide a smooth path for roller 32 or 34 to traverse about rotating means 22 as drive means 20 or 21 changes direction about the rectangular path of travel.

The outer sides 38 of adjoining channel 30, 31 may extend to join at the corners as shown in FIG. 6, or may be curved (not shown) to suit design preference. An insert 51 may be used at the corners of channel 30, 31 to form an outer radius about rotating means 22.

Figure 4A:
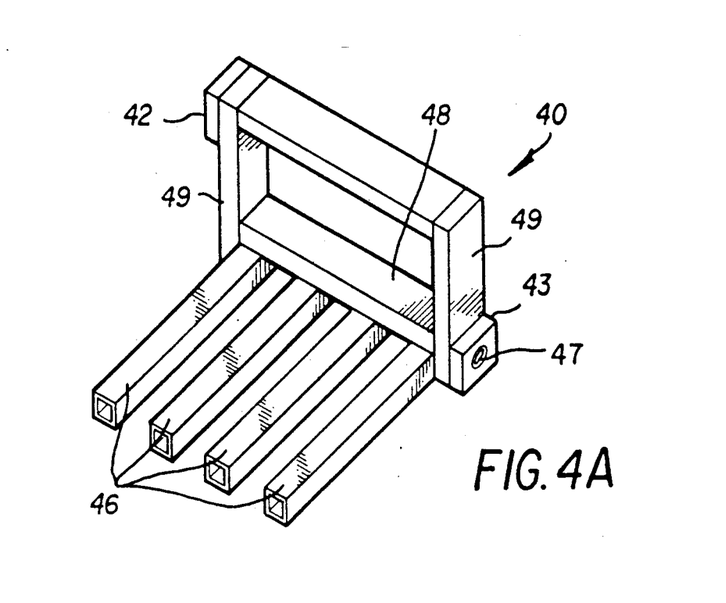
FIG. 4A and 4B show isometric views of alternate embodiments of a cantilevered platform having a first raised mounting bracket and a second lowered mounting bracket secured on opposite sides in proximity to the rear of the cantilevered platform.

As shown in FIG. 4A, the cantilevered platform 40 has at least three horizontal supports 46 extending in spaced, parallel relation from a rearward support 48, located above the horizontal supports 46. A vertical support 49 may be adapted to extend from the sides of the cantilevered platform 40 in proximity to the rearward support 48 to provide a means of securement for the first and second mounting brackets 42, 43. The vertical support 49 may extend between opposing vertical supports as shown in FIG. 4A to restrict articles from extending beyond the rear of the cantilevered platform 40.

Figure 4B:
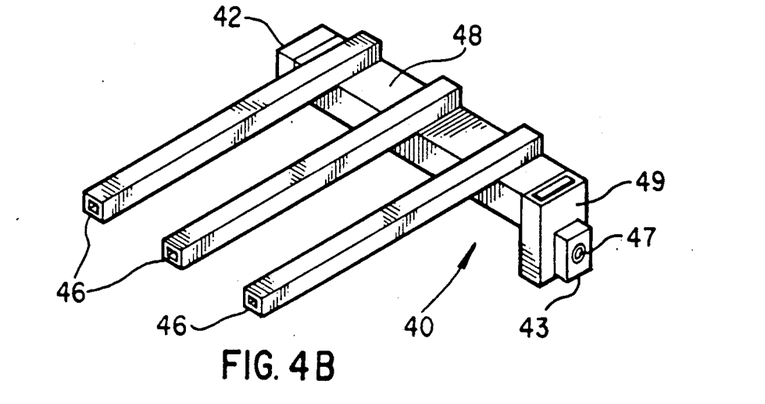

As shown in FIG. 4B, the cantilevered platform 40 may comprise at least three horizontal supports 46 extending in spaced, parallel alignment from a rearward support 48 located beneath the horizontal supports 46. A depending vertical support 49 is secured to the cantilevered platform 40 to provide a means for securement of the second mounting bracket 43 to the cantilevered platform 40.

Figure 8:
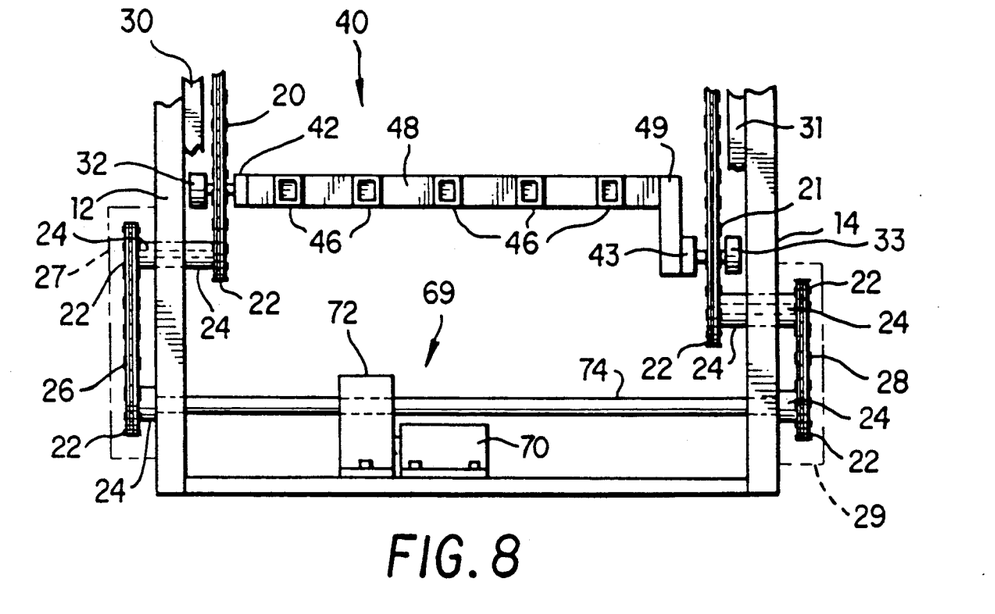
FIG. 8 is a partial view of the power means coupled to the first and second drive means by the third and fourth drive means.

Rearward support 48 may extend across spaced horizontal supports 46 at a location above, adjacent to, or beneath horizontal supports 46, as shown in FIG. 4A, 4B and 8. Horizontal supports 46 may be joined to rearward support 48 by any conventional means, such as welding, bolting, etc.

A first mounting bracket 42 is secured to the cantilevered platform 40 at a rearward location above, adjacent or below the spaced horizontal supports 46. The second mounting bracket 43 is secured to the cantilevered platform 40 at a rearward location in vertically offset alignment with the first mounting bracket 42. The vertical offset alignment between the first and second mounting brackets 42, 43 is substantially identical to the pre-determined vertical offset between the first and second drive means 20, 21.

Figure 7A:
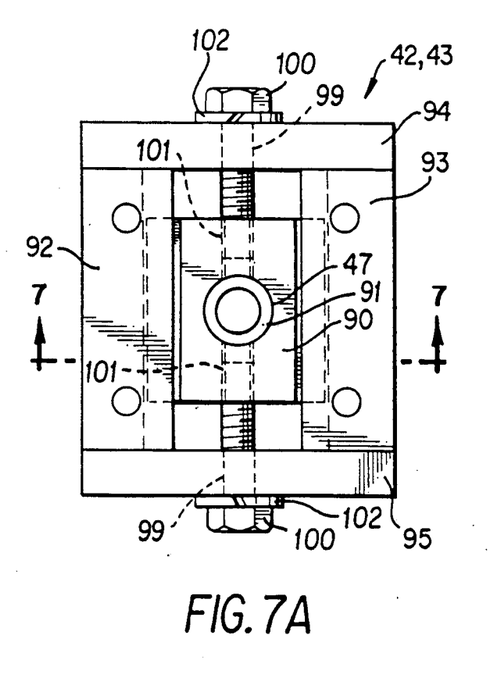
FIG. 7A is a plan view of an adjustable mounting means for securement to opposite sides of the cantilevered horizontal platform.
Figure 7B:
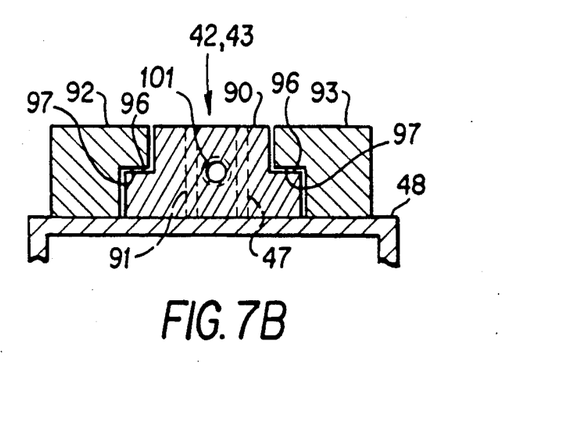
FIG. 7B is a cross sectional view of the mounting means, taken along lines 7—7 in FIG. 7A.

Preferably, at least one of the first and second mounting brackets 42, 43 is adjustably secured to the cantilevered platform 40 to provide a convenient means to align the cantilevered platform 40 at assembly. One means of adjustable securement is shown in FIG. 7A and 7B.

First and second horizontal pins 44, 45 rotatably engage respective first and second mounting brackets 42, 43. The horizontal pins 44, 45 are vertically offset from each other in parallel, offset, axial alignment to resist rotation of the cantilevered platform 40 about the horizontal pins 44, 45. A suitable bushing or bearing 47 may be disposed in mounting brackets 42, 43 to closely receive respective pins 44, 45 therein.

An important feature of the present invention, is the vertically offset alignment of the first and second mounting brackets 42, 43; the vertically offset alignment of the first and second drive means; and the vertically offset alignment of the first and second horizontal pins; which should all be of substantially the same pre-determined length, referenced above as "B" minus "A". To compensate for fabrication and component tolerances, at least one of the vertically offset elements referenced herein is preferably adjustable at assembly.

The adjustable securement of mounting brackets 42, 43 to cantilevered platform 40, provides ease of alignment of the cantilevered platform 40 at assembly, and also provides a means for adjustment of cantilevered platform 40 to compensate for roller 32, 34 wear. Mounting brackets 42, 43 may be adjustably secured to the cantilevered platform, as shown in FIG. 7A and 7B.

Adjustable mounting bracket 42, 43 preferably has opposing sides 92, 93 and ends 94, 95 with a block 90 positioned to be slidably disposed between opposing sides 94, 95. A ledge 96 on each opposing side 94, 95 serves to retain block 90 between opposing sides 92, 93. Block 90 may have an opposing complimentary ledge 97, or may have a flat top portion sized to be received beneath ledge 96.

An aperture 91 in block 90 is sized to closely receive one of the horizontal pins 44, 45 therein. Preferably a suitable bushing or bearing 98 is closely received in aperture 91, to rotatably engage one of the horizontal pins 44, 45 at assembly.

An aperture 99 is provided through each end 94, 95 to closely receive a suitable bolt 100 therethrough. Block 90 has opposing threaded apertures 101 aligned with apertures 99 in respective ends 94, 95, to threadably engage a bolt 100 from opposite ends 94, 95. Alternately, one or more studs (not shown) may extend from block 90 to pass through an aligned aperture 99 to threadably engage a suitable nut which may be tightened to secure block 90 within mounting bracket 44, 45. A lock washer 102 or other known means of restricting bolts 100 or studs from loosening may be used.

The adjustable mounting bracket 42, 43 may be secured to the cantilevered platform 40 by any conventional means, such as welding, bolting, riveting, etc. Once secured in the desired approximate location, one bolt 100 may be loosened, and the opposite bolt 100 tightened to draw the block 90 in the desired direction. Once aligned, both bolts 100 are tightened to secure the block 90 in place in relation to the mounting bracket 42 or 43.

Sufficient space is provided between block 90 and ends 94, 95 to provide adequate adjustment at assembly. The adjustable mounting bracket 42, 43 shown in FIG. 7A provides precise and controllable alignment of the vertical offset of the cantilevered platform 40 at assembly, using a conventional hand or power tool.

Preferably, one of the first and second mounting brackets 42, 43 is vertically adjustable to horizontally align the cantilevered platform 40 between first and second drive means 20, 21; and the other mounting bracket is preferably horizontally adjustable to raise or lower the spaced supports 46 on the cantilevered platform 40 to a horizontal alignment.

While one preferred adjustable securement means is shown in FIG. 7A and 7B, other means of adjustable securement known in the art may also be employed without departing from the spirit of this disclosure or the scope of the following claims.

Where more than one cantilevered platform 40 is used, the multiple cantilevered platforms 40 are preferably equally spaced about drive means 20, 21, to provide uniform cycle times, as the cantilevered platforms 40 follow their rectangular path of travel.

Figure 2:
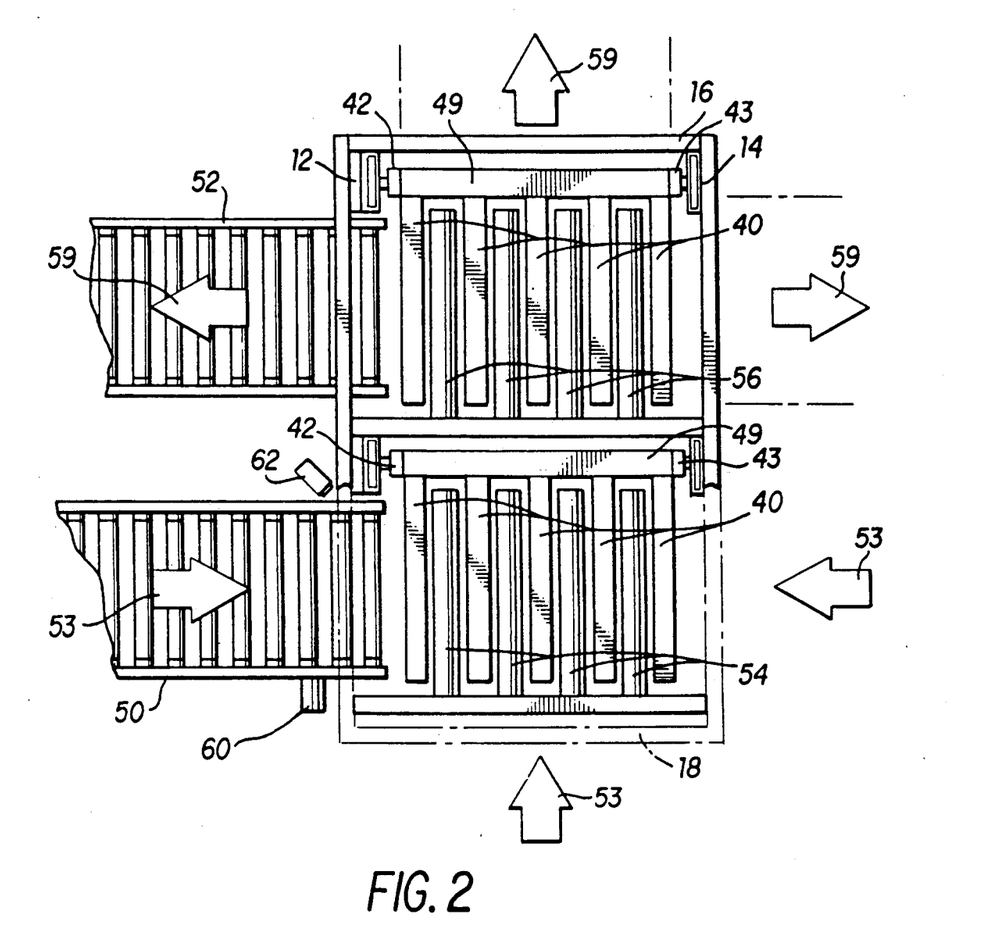
FIG. 2 is a top view of the vertical conveyer, showing multiple cantilevered platforms mounted within a support structure, with arrows showing three possible directions of inlet conveyer access and three possible directions of outlet conveyer access.

As shown in FIG. 2, the inlet conveyer 50 is positioned adjacent to inlet conveying means 54. Inlet conveying means 54 may comprise gravity or powered horizontally spaced rollers, wheels, belts or other article support and transfer means known in the art. The inlet conveyer 50 may be positioned to the left, right or front side of inlet conveying means 54, as noted by arrows 53. Because platform 40 is cantilevered, inlet conveyer 50 will not interfere with drive means 20, 21 in any position noted by arrows 53.

Spaced horizontal supports 46 on cantilevered platform 40 are positioned to pass between offset, spaced inlet conveying means 54 as the cantilevered platform 40 is vertically raised along its rectangular path of travel. An article 11 from inlet conveyer 50 is positioned upon the offset, spaced inlet conveying means 54 and picked up by the spaced horizontal supports 46 on cantilevered platform 40 as they pass between the offset horizontal spaced supports on inlet conveying means 54.

The cantilevered platform 40 continues to traverses the rectangular path of travel, and deposits article 11 upon the offset, horizontally spaced outlet conveying means 56 adjacent to outlet conveyer 52, as the cantilevered platform 40 moves vertically downward through the outlet conveying means 56.

Outlet conveying means 56 should be positioned to ensure clearance of cantilevered platform 40 as the cantilevered platform moves rearwardly along the upper portion of the rectangular path of travel. The spaced horizontal supports 46 on cantilevered platform 40 pass between the offset spaced outlet conveying means 56 on the vertically downward path of travel, depositing the article 11 upon the outlet conveying means 56.

Outlet conveying means 56 receives articles 11 from the cantilevered platform 40, and conveys each article 11 from the outlet conveying means 56 to the outlet conveyer 52. The outlet conveyer 52 may be positioned adjacent to the outlet conveying means 56 in any one of the three output conveyer directions noted by outlet arrows 59, in accordance with design preference or site requirements.

Article 11 may be a box, package, tray or container large enough to be lifted by at least two of the spaced horizontal supports 46 on cantilevered platform 40, and small enough to pass between spaced parallel side supports 12, 14, of support structure 15. Preferably, the spaced horizontal supports 46 on cantilevered platform 40 are positioned across the longitudinal length of article 11, as article 11 passes from inlet conveyer 50 onto inlet conveying means 54.

Inlet and outlet conveyers 50, 52 may be in the form of conventional roller, wheeled or track type conveyers, or may be in the form of a monorail system which advances a plurality of articles 11 from a remote location to the vertical conveyer 10, and from the vertical conveyer 10 to at least one remote location.

Preferably, one or more restricted access means 60 are provided on inlet conveyer 50 adjacent to inlet conveying means 54, to ensure that only one article is positioned on the inlet conveying means 54 at a time. One or more sensing means 62 may be used to locate an article 11 on inlet conveying means 54.

The restricted access means 60 may be a braking and/or power roller positioned in proximity to the inlet conveyer 50 to selectively restrict or bias articles 11 onto the inlet conveying means 54. Other known restricted access means 60, such as a limit stop mechanism actuated by a biasing means such as a solenoid, piston or mechanical biasing means (not shown), may also be used in proximity to the inlet conveyer 50 to controllably restrict access of articles 11 to inlet conveying means 54.

A sensing means 62 preferably controls actuation of the restricted access means 60. A sensing means 62 may also monitor the presence of articles 11 on outlet conveying means 56, to stop the power means 69 in the event of a jam.

A power means 69 selectively rotates the first and second drive means 20, 21 at equal speeds about the vertically offset, rectangular path of travel. The power means 69 preferably comprises a prime mover 70, such as an electric motor, which drives a transmission 72 to rotate a drive shaft 74.

The power means 69 may be secured to the supporting structure 15 at a location below the rectangular path of travel of drive means 20, 21, as shown in FIG. 8. Alternately, the power means 69 may be mounted beside or above the rectangular path of travel of first and second drive means 20, 21, in accordance with design choice, ease of maintenance or site restrictions, etc.

The power means 69 is secured to the supporting structure 15 at a location external of the rectangular path of travel of the first and second drive means 20, 21. The power means is positioned to clear the cantilevered platform 40 as the cantilevered platform 40 traverses along the rectangular path of travel of the first and second drive means 20, 21. The power means 69 may be pre-assembled as a modular unit and releasably secured to the support structure 15 for ease of assembly.

Drive shaft 74 is preferably rotatably coupled by a third drive means 26 to the first drive means 20, and is also rotatably coupled by a fourth drive means 28 to the second drive means 21. The third and fourth drive means 26, 28 are vertically offset a pre-determined distance equal to the vertical offset alignment of the first and second drive means 20, 21. The third and fourth drive means 26, 28 are coupled to suitable rotating means 22 in axial alignment with the rotating means 22 used for respective drive means 20, 21. See FIG. 8.

Where the drive shaft 74 is mounted beneath the first and second drive means 20, 21 as shown in FIG. 1, the third drive means 26 is longer than the fourth drive means 28, by a distance equal to the vertical offset between the first and second drive means 20, 21. Where the drive shaft 74 is mounted above the first and second drive means 20, 21, the third drive means 26 is shorter than the fourth drive means 28, by a pre-determined distance equal to the vertical offset alignment referenced above.

The first and second rollers 32, 33 must be able to rotate about the rectangular path of travel without interfering with the rotating means 22 or the third or fourth drive means 26, 28. As shown in FIG. 8, this may be accomplished by extending the third and fourth drive means 26, 28 beyond the path of travel of rollers 32, 33. Thus, rotation of drive shaft 74, serves to rotate first and second drive means 20, 21 at equal speeds over vertically offset, rectangular paths of travel of equal length.

Preferably, the vertical lift conveyer 10 speed may be selectively controlled to vary the speed of the first and second drive means 20, 21, as articles 11 are transferred by the cantilevered platform 40 from the inlet conveyer 50 to the outlet conveyer 52. The transfer rate of articles 11 is dependent upon the speed of the first and the second drive means 20, 21, the number of cantilevered platforms 40 used, and the distance traveled between the upper and lower conveyers 50, 52. A variable speed transmission 72 is the preferred means to control the speed of the drive shaft 74, which in turn controls the speed of drive means 20, 21.

The vertical conveyer 10 may be actuated by a stop/start switch 80, mounted on a control panel 82, which is preferably secured to support structure 15. Alternately, the vertical conveyer 10 may be actuated from a remote location (not shown). Electrical wiring preferably interconnects the various control components to the control panel 82. Other known means, such as hydraulic, pneumatic, optical, or mechanical means, may also be used to actuate the various control components on the vertical conveyer 10.

When swith 80 is actuated, power from a remote source (not shown), actuates the prime mover 70, such as an electric motor, which acts through transmission 72 to rotate drive shaft 74. Drive shaft 74 is rotatably connected to the first raised drive means 20 by third drive means 26. Drive shaft 74 is also rotatably connected to the second lower drive means 21 by fourth drive means 28. The different lengths of the third and fourth drive means 26, 28 are sized to compensate for the pre-determined distance of the vertically offset alignment of the first and second drive means 20.

Because first and second drive means 20, 21 are the same size and length, and the rotating means 22 are of a similar size, both first and second drive means 20, 21 rotate at the same speed, ensuring that the horizontal platform 40 remains substantially level during the entire rectangular path of travel.

A variable speed transmission 72 may be controlled by a variable speed control means 76 mounted on the control panel 82. When the variable speed control means 76 is actuated, the transmission 72 speed is changed, which selectively increases or decreases the speed of first and second drive means 20, 21. The variable speed transmission 72 may be selected to provide continuously variable speed adjustment, or incremental speed adjustment to suit design preference.

Other safety and control devices 88 may also be mounted on the control panel 82. An audible, visual or remote alarm system 84 may be actuated by a backup of articles 11 on either the inlet or outlet conveyers 50, 52, or by malfunction of any monitored equipment. Any known sensing means 62 may be used, such as light, sound or weight, to monitor various elements of the vertical conveyer 10.

For safety, the vertical conveyer 10 may be enclosed by any suitable material 58, such as expanded metal, shown in FIG. 1. Where the vertical conveyer 10 is enclosed with a suitable material 58, at least one access panel 57 is preferably provided to allow access to the internal portion of vertical conveyor 10, for ease of maintenance and repair.

A spur conveyer (not shown) may be adapted to feed articles 11 onto the vertical conveyer 10. The spur conveyer may be provided with suitable sensors 62, and restricted access means 60 to control the selective passage of articles 11 from the spur conveyer onto the vertical lift 10 at any of the unused inlet conveyer 50 or outlet conveyer 52 positions noted by arrows 53, 59 in FIG. 2. Alternately, the spur conveyer may feed articles 11 onto inlet conveyer 50 or outlet conveyer 52 at a location remote from vertical conveyer 10.

One or more sensing means 62 may be used to monitor the presence of a single article 11 on inlet conveying means 54. Likewise, a sensing means 62 may also be used to monitor the presence of a single article on outlet conveying means 56. Input from the sensing means 62 may be used to control the actuation of the inlet and outlet conveying means 54, 56, or to control one or more restricted access means 60.

An emergency stop control switch 86 may be positioned on at least one side of the inlet conveyer 50, to stop the inlet conveyer 50, spur conveyer, inlet conveying means 54, outlet conveying means 56, vertical conveyer 10 and/or outlet conveyer 52, in the event of an emergency. For example, emergency stop control switch may be manually actuated when an article 11 fails to properly clear the inlet conveyer 50 or outlet conveyer 52, or a skewed article 11 is detected on one of the cantilevered horizontal platforms 40.

Inlet and outlet conveying means 54, 56 may be gravity actuated, or powered by wheels, belts, rollers, push rods, or other devices known in the art to selectively advance an article 11 into position for subsequent processing.

One or more outlet conveying means 56 may be selectively actuated to receive an article 11 from cantilevered platform 40, in order to route article 11 onto one or more selected outlet conveyers 52 positioned at different heights or in different directional locations at the same height. Where more than one outlet conveying means 56 us used, (not shown) the upper outlet conveying means 56 must be selectively actuated to raise, lower or shift into position to selectively receive the next available article 11 thereon.

Bar coding, or other identification means (not shown) may be used to identify each article 11, and to selectively shift the outlet conveying means 56 into position to receive a selected article 11 at a selected outlet conveyer 52 location. A sensing means may be positioned to monitor the identifying means on each article 11 as it passes along inlet conveyer 50, and a programmable logic control means (not shown) may actuate the selected outlet conveying means 56 in response to the identifying means, in time to selectively route each article 11 from cantilevered platform 40 to its desired conveyer destination.

The outlet conveying means 56 may include a powered track or rollers (not shown) to selectively route article 11 to more than one selected destination. More than one outlet conveyer 52 may be used at the same height to selectively transfer articles 11 according to their respective bar code identification, or their resulting conveyer destination as determined by the bar code identification or by the logic control means.

a programmable logic control means (not shown) also may be used to coordinate operation of the vertical lift conveyer 10 with the logic control of other material handling devices (not shown) in a large scale material handling system.

The vertical lift conveyer 10 may be pre-assembled and shipped as a completed assembly to the point-of-use. Alternately, the vertical conveyer 10 may be shipped in modular units, for installation of the modular units at the point of use.

Thus, while the improved vertical conveyer apparatus 10 has been full described and disclosed, numerous modifications will become apparent to one of ordinary skill in this art, and such adaptations and modifications are intended to be included within the scope of the following claims.

What is claimed is:

1. An improved vertical lift conveyer apparatus, for moving articles between different heights, comprising:
   a) a support structure having opposed first and second sides disposed in parallel, spaced relation, with cross braces extending between the first and second sides;
   b) a first drive means secured by a plurality of rotating means to the first side of the support structure; and a second drive means secured by a plurality of rotating means to the second side of the support structure; the first and second drive means each forming a rectangular path of travel of equal length, in a vertically offset alignment of a pre-determined distance;
   c) at least one cantilevered platform having at least three spaced, horizontal supports secured to a rear support;
   d) a first, mounting bracket secured to the cantilevered platform on one side in proximity to the rear support; and a second, mounting bracket secured to the cantilevered platform on the opposite side in proximity to the rear support, the first and second mounting brackets secured to the cantilevered platform in a vertically offset alignment of a pre-determined distance substantially equal to the offset alignment of the first and second drive means;
   e) a first horizontal pin secured to the first drive means and positioned to rotatably engage the first mounting bracket, and a second horizontal pin secured to the second drive means and positioned to rotatably engage the second mounting bracket, in vertical offset alignment of a pre-determined distance substantially equal to the vertical offset alignment of the first and second drive means;
   f) a first roller rotatably secured adjacent to the first drive means in axial alignment with the first horizontal pin; and a second roller rotatably secured adjacent to the second drive means in axial alignment with the second horizontal pin;
   g) a first channel having a base and sides, the base secured to the first side of the support structure, substantially in alignment with the rectangular path of travel of the first drive means; a second channel having a base and sides, the base secured to the second side of the support structure substantially in alignment with the rectangular path of travel of the second drive means; the first and second channels sized to freely receive the respective first and second rollers therein; and
   h) a power means secured to the support structure, and positioned to rotate the first and second drive means at equal speeds, about the vertically offset, rectangular path of travel.

2. The apparatus of claim 1, wherein at least one of the first and second mounting brackets is adjustably secured to the cantilevered platform, to proide an adjustable means of alignment of the cantilevered platform.

3. The apparatus of claim 1, wherein at least one rotating means is adjustably secured to the first side of the support structure, and at least one rotating means is adjustably secured to the second side of the support structure, to provide a means for tensioning the respective first and second drive means.

4. The apparatus of claim 1, wherein the sides of the first channel are sized to at least partially enclose the first drive means substantially along the entire rectangualar path of travel, and the sides of the second channel are sized to at least partially enclose the second drive means substantially along the entire rectangular path of travel.

5. The apparatus of claim 1, wherein an inlet conveyer is positioned to convey articles from the inlet conveyer to an inlet conveying means positioned in a direction selected from the left, right or front of the vertical conveyer, and the outlet conveyer is positioned to receive articles from the cantilevered platform to an outlet conveying means, and to convey the articles from the outlet conveying means to an outlet conveyer positioned in a direction selected from the left, right and back of the vertical conveyer.

6. The apparatus of claim 5, wherein at least one restricted access means in controlled by at least one sensing means to limit access of articles onto each cantilevered platform as the cantilevered platform follows a rectangular path of travel between the inlet and outlet conveying means.

7. The apparatus of claim 1, wherein the power means comprises a prime mover rotatably secured to the inlet of a variable speed transmission having an outlet rotatably secured to a drive shaft, with a third drive means rotatably coupled between the drive shaft and the first drive means, and a fourth drive means rotatably coupled between the drive shaft andd the second drive means in offset vertical alignment of a pre-determined distance substantially equal to the offset vertical alignment of the first and second drive means.

8. The apparatus of claim 1, wherein the first and second rollers are at least partially made of ultra high weight molecular polyethylene.

9. The apparatus of claim 1, wherein the vertically offset alignment of a pre-determined distance is selected from a range of six inches to 48 inches.

10. A vertical conveyer apparatus, which comprises:
a) a support structure having first and second side supports and opposing cross braces;
b) a first drive means rotatably secured in a rectangular path of travel to the first side support, and a second drive means rotatably secured in a rectangular path of travel to the second side support; the first and second drive means being of equal length and disposed in vertically offset alignment of a pre-determined distance;
c) a cantilevered platform having spaced horizontal supports secured to a rear support; with first and second mounting brackets secured on opposite side of the cantilevered platform in proximity to the rear support in vertically offset alignment of a pre-determined distance substantially equal to the vertically offset alignment of the first and second drive means:
d) a first horizontal pin rotatably disposed in alignment with the first mounting bracket, with one end of the first horizontal pin secured to the first drive means, and a first roller disposed adjacent to the first drive means in axial alignment with the first horizontal pin; and a second horizontal pin rotatably disposed in horizontal alignment in the second mounting bracket, with one end of the second horizontal pin secured to the second drive means, and a second roller disposed adjacent to the second drive means in axial alignment with the second horizontal pin;
e) a first channel secured to the first side of the support structure and positioned to receive the first roller and at least a portion of the first drive means therein, substantially along the rectangular path of travel of the first guide means; and a second guide channel secured to the second side of the structure and positioned to receive the second roller and at least a portion of the second drive means therein, substantially along the rectangular path of travel of the second guide means;
f) an inlet conveyer having an adjacent, spaced inlet conveying means, and an outlet conveyer having an adjacent, spaced outlet conveying means, with spaced horizontal supports on the cantilevered platform positioned to pass between a plurality of spaced, inlet conveying means and a plurality of spaced outlet conveying means;
g) a power means secured to the support structure, the power means having at least a prime mover; a drive shaft responsive to movement of the prime mover; a third drive means in rotational engagement between the drive shaft and the first drive means; a fourth drive means in rotational engagement between the drive shaft and the second drive means; and The power means selectively rotates the first and second drive means at equal speeds, to vertically raise the cantilevered platform horizontally through the spaced, inlet conveying means, and to lower the cantilevered platform horizontally through the spaced, outlet conveying means, as the cantilevered platform traverses the rectangular path of travel of the vertically offset first and second drive means.

11. The apparatus of claim 10, wherein at least a portion of the first and second rollers are made of ultra high weight molecular polyethylene.

12. The apparatus of claim 10, wherein at least one of the first and second mounting brackets is adjustably secured to the cantilevered platform, to provide an adjustable means for alignment of the cantilevered platform in relation to the first and second drive means.

13. The apparatus of claim 10, wherein at least one rotating means is adjustably secured to the first side of the support structure, and at least one rotating means is adjustably secured to the second side of the support structure, to provide a means for tensioning the first and second drive means.

14. The apparatus of claim 10, wherein the vertically offset alignment of a pre-determined distance is selected from a range of six inches to 48 inches.

15. A improved conveyer apparatus, for moving articles between inlet and outlet conveyers of different heights, comprising:
a) a support structure having a first side support and an opposed, spaced, parallel second side support;
b) first and second drive means of equal length, rotatably secured to the support structure in a spaced, rectangular path of travel; the first and second drive means disposed in parallel, vertically offsec alignment of a pre-determined distance;
c) a channel secured to the support structure, substantially in alignment with the respective first and second drive means;
d) at least one cantilevered platform with at least three spaced horizontal supports secured to a rear support, with first and second mounting brackets secured on opposite sides of the cantilevered platform in proximity to the rear support in vertically offset alignment of a pre-determined distance substantially equal to the vertically offset alignment of the first andd second drive means;
e) a first horizontal pin secured to the first drive means and positioned to rotatably engage the first mounting bracket; a second horizontal pin secured to the second drive means and positioned to rotatably engage the second mounting bracket;
f) a first roller rotatably secured adjacent to the first drive means in axial alignment with the first horizontal pin; and a second roller rotatably secured adjacent to the second drive means in axial alignment with the second horizontal pin; the first and second rollers sized to be received within the respective channels;

g) an inlet conveying means with spaced, horizontal supports, disposed adjacent to the inlet conveyer, and an outlet conveying means with spaced, horizontal supports, disposed adjacent to the outlet conveyer; the cantilevered platform positioned to pass between the spaced horizontal supports of the inlet and outlet conveying means; and h) a power means to selectively rotate the first and second drive means at equal speeds, about the rectangular path of travel of the first and second drive means.

16. The apparatus of claim 15, wherein at least one of the first and second mounting brackets is adjustably secured to the cantilevered platform, to provide an adjustable means for alignment of the cantilevered platform.

17. The apparatus of claim 15, wherein at least one rotating means is adjustably secured to the first side of the support structure, and at least one rotating means is adjustably secured to the second side of the support structure, to provide a means for tensioning the first and second drive means.

18. The apparatus of claim 15, wherein the sides of the first channel are sized to at least partially enclose the first drive means substantially along the entire rectangular path of travel, and the sides of the second channel are sized to at least partially enclose the second drive means substantially along the entire rectangular path of travel.

19. The apparatus of claim 15, wherein the first and second rollers are at least partially made of ultra high weight molecular polyethylene.

20. The apparatus of claim 15, wherein the vertically offset alignment of a pre-determined distance is selected from a range of six inches to 48 inches.

* * * * *